(12) United States Patent
Ghoneima et al.

(10) Patent No.: US 7,190,286 B2
(45) Date of Patent: Mar. 13, 2007

(54) SINGLE-STAGE AND MULTI-STAGE LOW POWER INTERCONNECT ARCHITECTURES

(75) Inventors: Maged M. Ghoneima, Evanston, IL (US); Peter Caputa, Linkoping (SE); Muhammad M. Khellah, Lake Oswego, OR (US); Ram Krishnamurthy, Portland, OR (US); James W. Tschanz, Portland, OR (US); Yiben Ye, Hillsboro, OR (US); Vivek K. De, Beaverton, OR (US); Yehea I. Ismail, Evanston, IL (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/314,236

(22) Filed: Dec. 22, 2005

(65) Prior Publication Data

US 2006/0109028 A1 May 25, 2006

Related U.S. Application Data

(63) Continuation of application No. 10/813,084, filed on Mar. 31, 2004, now Pat. No. 6,992,603.

(51) Int. Cl.
*H03M 7/46* (2006.01)
*H03M 7/00* (2006.01)

(52) U.S. Cl. .............................. 341/63; 341/50; 326/82

(58) Field of Classification Search ................. 341/63, 341/136; 326/82–90
See application file for complete search history.

(56) References Cited

U.S. PATENT DOCUMENTS

| | | | | |
|---|---|---|---|---|
| 5,228,037 A | * | 7/1993 | Yonehara | 370/509 |
| 5,337,252 A | * | 8/1994 | Lac et al. | 716/13 |
| 5,689,258 A | * | 11/1997 | Nakamura et al. | 341/136 |
| 5,763,908 A | * | 6/1998 | Han et al. | 257/208 |
| 6,708,314 B2 | * | 3/2004 | Trivedi et al. | 716/2 |
| 6,880,026 B2 | * | 4/2005 | Imming et al. | 710/106 |
| 2003/0025122 A1 | * | 2/2003 | Nakamura et al. | 257/100 |

OTHER PUBLICATIONS

Lin Li et al., A Crosstalk Aware Interconnect with Variable Cycle Transmission, Feb. 16, 2004, IEEE, Proceedings of the Design, Automation and Test in Europe Conference & Exhibition (DATE'04) vol. 1, pp. 102-107.

Rejesh Kumar et al.; "Interconnect and Noise Immunity Design for the Pentium 4 Processor," Intel Technology Journal Q1, 2001; pp. 1-2, 2003. no month.

Daniel Wiklund et al., "SoCBUS: Switched Network on Chip for Hard Real Time Embedded Systems;" Eight Unnumbered Pages, 2003, no month.

(Continued)

*Primary Examiner*—Jean Bruner Jeanglaude
(74) *Attorney, Agent, or Firm*—Fleshner & Kim, LLP

(57) ABSTRACT

An interconnect architecture is provided to reduce power consumption. A first driver may drive signals on a first interconnect and a second driver may drive signals on a second interconnect. The first driver may be powered by a first voltage and the second driver may be powered by a second voltage different than the first voltage.

21 Claims, 4 Drawing Sheets

OTHER PUBLICATIONS

Ismail et al., "Repeater Insertion in *RLC* Lines for Minimum Propagation Delay", Jul. 1999 IEEE, pp. Vl-404-Vl-407.

Maged Ghoneima et al., "Utilizing the Effect of Relative Delay on Energy Dissipation in Low-Power On-Chip Buses;" pp. 1-25, vol. 12, No. 12 Dec. 2004.

Muhammad Khellah et al., "Static Pulsed Bus for On-Chip Interconnects," 2002 Symposium on VLSI Circuits Digest of Technical Papers, pp. 78-79, 2002, no month.

Youngsoo Shin et al, "Coupling-Driven Bus Design for Low-Power Application-Specific Systems" DAC2001, Jun. 18-22, 2001, Las Vegas, Nevada.

Mircea R. Stan, et al, "Bus-Invert Coding for Low-Power I/O," IEEE Transactions on Very Large Scale Integration (VLSI) systems, vol. 3, No. 1, Mar. 1995.

Kei Hirose et al., "A Bus Delay Reduction Technique Considering Crosstalk," 5 unnumbered pages, pp. 441-445, 2000.

* cited by examiner

SINGLE-STAGE AND MULTI-STAGE LOW POWER INTERCONNECT ARCHITECTURES

This application is a continuation of U.S. patent application Ser. No. 10/813,084 filed on Mar. 31, 2004 now U.S. Pat. No. 6,992,603, the subject matter of which is incorporated herein by reference.

FIELD

Embodiments of the present invention relate to interconnects. More particularly, embodiments of the present invention relate to reducing energy consumption of single-stage and/or multi-stage interconnect architectures.

BACKGROUND

Low power design is a major issue in integrated circuit design. With the continuous scaling of technology, increased die area and faster clock speeds, the power consumption of on-chip interconnects is very significant.

Long on-chip interconnects are one of the main bottlenecks in microprocessor design due to the impact of coupling capacitance on both interconnect (or bus) delay and power dissipation. For example, in deep submicron technology, the aspect ratio may be over 2.0 for intermediate wiring layers. This indicates that the lateral component of the interconnect capacitance (i.e., coupling capacitance) continually grow to dominate the total interconnect capacitance due to reduction in wire pitch and an increase in the aspect ratio of the interconnect. Lateral interconnect capacitance components are from three to five times as much as vertical capacitance components. Architectures should be designed to reduce the impact of the coupling capacitance on energy dissipation and delay of on-chip interconnects.

Introducing a relative delay between adjacent lines reduces the maximum effective coupling capacitance by approximately half which leads to a considerable reduction in the maximum total capacitance and hence bus delay. Techniques may introduce a relative delay between oppositely switching lines to reduce interconnect delays and increase bus performance. A delay may be introduced by adding extra buffers on alternate bus lines, or skewing the inverters to change the rise and fall delays of the repeaters. On average, if a relative delay is permanently introduced between any two adjacent lines, then the average energy dissipation of the bus will not change.

BRIEF DESCRIPTION OF THE DRAWINGS

The foregoing and a better understanding of the present invention will become apparent from the following detailed description of arrangements and example embodiments (and the claims) when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

The following represents brief descriptions of the drawings in which like reference numerals represent like elements and wherein.

DETAILED DESCRIPTION

Figure 1:
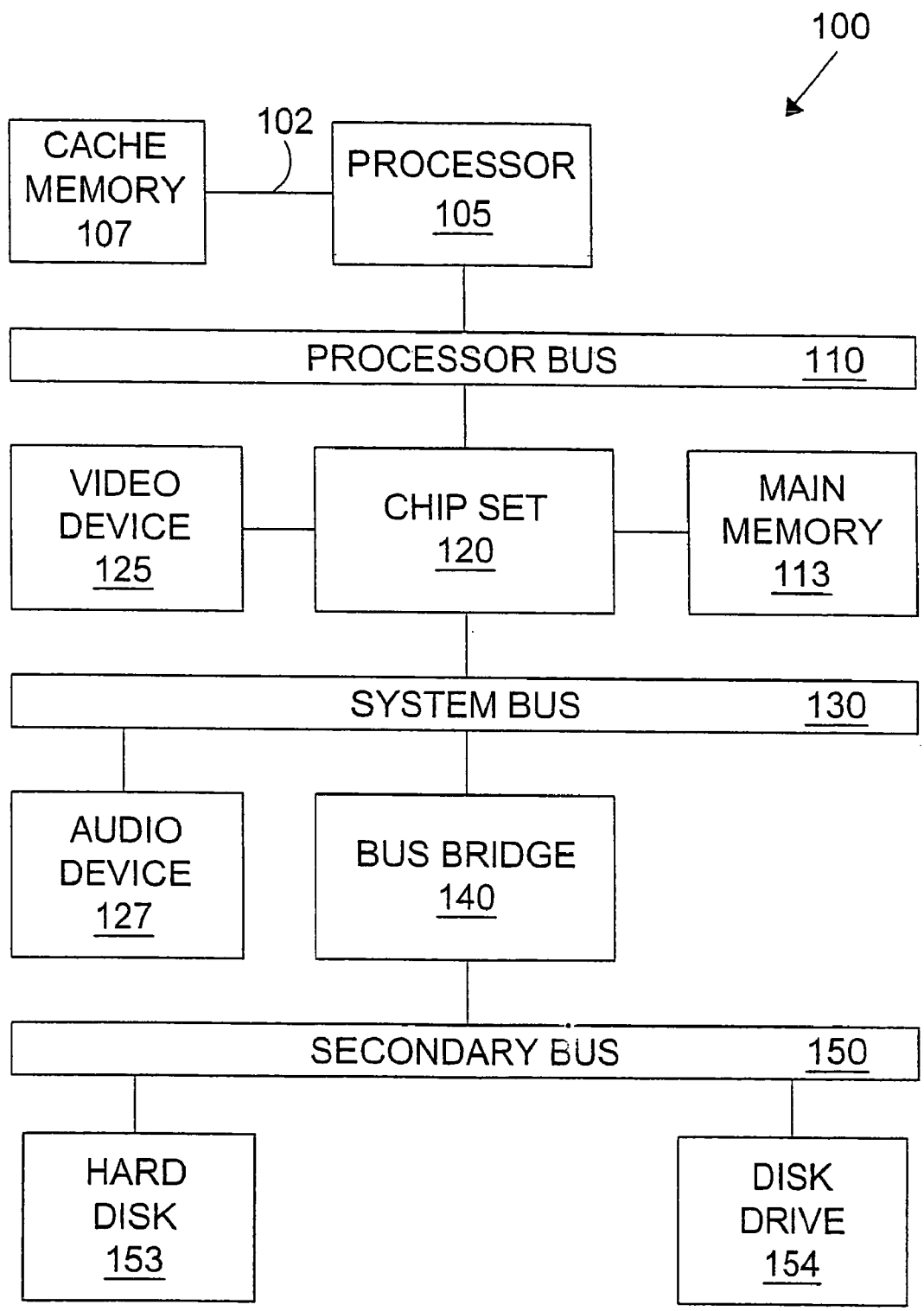
FIG. 1 is a block diagram of a computer system according to an example arrangement.

In the following detailed description, like reference numerals and characters may be used to designate identical, corresponding or similar components in differing figure drawings. Further, in the detailed description to follow, example sizes/models/values/ranges may be given although the present invention is not limited to the same. Where specific details are set forth in order to describe example embodiments of the invention, it should be apparent to one skilled in the art that the invention can be practiced without these specific details.

In this disclosure, the terminologies interconnect and bus may be used interchangeably to relate to a plurality of signal lines in which each signal line may separately carry separate signals. The terminology line, signal line or interconnect may relate to one of the signal lines on the interconnect or bus. Additionally, adjacent signal lines relate to signal lines that are provided immediately adjacent to one another. For ease of illustration, the examples and the figures discussed herein may only describe and/or show a small number of signal lines on an architecture. Other numbers of signal lines are also fully within the scope of this disclosure. Additionally, while the description may relate to signals traveling in one direction, the interconnects may be bi-directional.

Interconnect architectures will hereafter be discussed with respect to reducing the power consumption of single stage and multi-stage buses, with minimal delay penalties.

Embodiments of the present invention may introduce a relative delay between adjacent interconnects to not only reduce a worst-case delay, but also reduce an average interconnect energy dissipation. This is performed by reducing the drivers' voltage supply of alternate bus lines, such that for any two adjacent bus lines, the driver voltage supply of one line has the nominal value $V_{DD}$, while the driver voltage supply of the other line has a reduced voltage ($V_{DD}-\Delta V$). Reducing the voltage supplies of alternate bus lines increases their delay compared to their adjacent lines and thus introduces a relative delay between adjacent signal lines. Relative delays between adjacent lines reduce the effective coupling capacitance which in turn further reduces the overall interconnect delay and hence improves the bus performance. Relative delays do not affect the average energy dissipation, but lowering the alternate line voltage supplies lowers their average energy dissipation and hence reduces the overall bus energy dissipation.

Embodiments of the present invention may combine low power bus coding followed by dynamic delaying the data of certain signal lines of a multi-stage interconnect structure. Low power bus coding encodes the transmitted data on the signal lines to lower the worst-case effective coupling capacitance and hence reduce the average energy dissipation. Dynamic delaying introduces relative delays between specific lines according to their relative switching activity in order to reduce the worst case coupling capacitance and hence the overall average energy dissipation. Low power bus encoding and dynamic delaying can be cascaded as their operation is independent of one other and thus their combined energy dissipation can be achieved. The impact of delay penalty associated with the bus encoding/decoding hardware and the dynamic delay circuit can be reduced by amortizing it over several stages when this architecture is applied to multi-stage time-borrowing buses. Thus, combining low power encoding with dynamic delaying in multi-cycle time-borrowing buses leads to significant energy savings while adding a small delay overhead per bus stage.

A General Computer System

FIG. 1 is a block diagram of a computer system 100 according to an example arrangement. Other arrangements are also possible. A computer system 100 may include a processor 105 coupled to a processor bus 110. The processor 105 may include a first level (L1) cache memory (not shown in FIG. 1).

The processor 105 may also be coupled to a cache memory 107, which is a second level (L2) cache memory, via a dedicated cache bus 102. The L1 and L2 cache memories can also be integrated into a single device. Alternatively, the cache memory 107 may be coupled to the processor 105 by a shared bus.

A chip set 120 may also be coupled to the processor bus 110. The chip set 120 may include a memory controller for controlling a main memory 113. Further, the chip set 120 may be coupled to a video device 125 that handles video data requests to access the main memory 113. The video device 125 may include a video monitor such as a cathode ray tube (CRT) or liquid crystal display (LCD) and necessary support circuitry.

The main memory 113 may be coupled to the processor bus 110 through the chip set 120. The main memory 113 and the cache memory 107 may store sequences of instructions that are executed by the processor 105. The main memory 113 may include a Rambus dynamic random access memory (RDRAM) system or the main memory 113 may have other configurations. The sequences of instructions executed by the processor 105 may be retrieved from the main memory 113, the cache memory 107, or any other storage device. Additional devices may also be coupled to the processor bus 110, such as multiple processors and/or multiple main memory devices. The computer system 100 is described in terms of a single processor; however, multiple processors can be coupled to the processor bus 110.

The processor bus 110 may be coupled to a system bus 130 by the chip set 120. The system bus 130 may be a Peripheral Component Interconnect (PCI) bus adhering to a Specification Revision 2.1 bus developed by the PCI Special Interest Group of Portland, Oreg.; however, other bus standards may also be used. Multiple devices, such as an audio device 127, may be coupled to the system bus 130.

A bus bridge 140 may couple the system bus 130 to a secondary bus 150. For example, the secondary bus 150 may be an Industry Standard Architecture (ISA) Specification Revision 1.0a bus developed by International Business Machines of Armonk, N.Y. However, other bus standards may also be used such as Extended Industry Standard Architecture (EISA) Specification Revision 3.12 developed by Compaq Computer, et al. Multiple devices, such as a hard disk 153 and a disk drive 154 may be coupled to the secondary bus 150. Other devices, such as cursor control devices (not shown in FIG. 1), may be coupled to the secondary bus 150.

The computer system 100 described above (or other electronic devices/systems) may include one or more chips (also referred to as chipsets or dies) within various components or forming one or more of the components. In disadvantageous arrangements, long interconnects traversing across a die (or between dies) incur a substantial delay due to large RC (i.e., resistance×capacitance) values that impede a signal traveling from a source to a destination. In deep submicron (DSM) technologies, these RC values have dramatically increased due to the dominating effect of coupling capacitance. The growing impact of the coupling capacitance between adjacent interconnects affect the maximum speed at which an entire chip may operate, as well as the overall energy dissipation. Repeater circuits may be provided to aid in these problems. Embodiments of the present invention relate to on-chip interconnect architectures that reduce the average interconnect dissipation as will now be described.

Effect of Capacitive Coupling on Interconnect Delay and Energy Dissipation

Figure 2A:
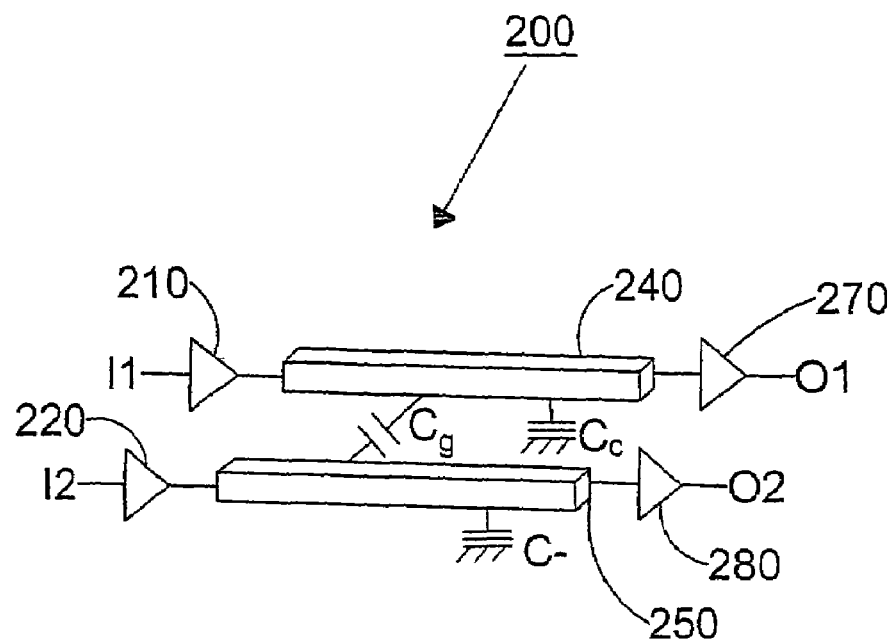
FIG. 2A illustrates a two-line directional interconnect structure according to an example arrangement.
Figure 2B:
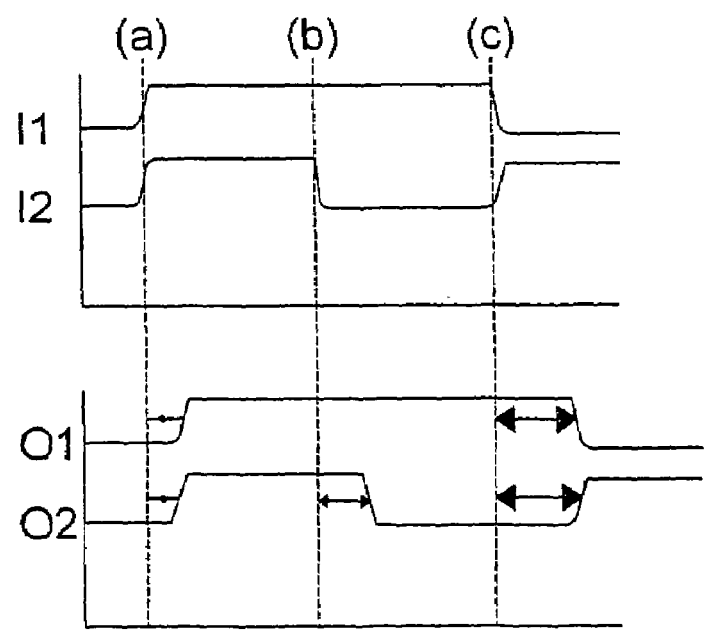
FIG. 2B illustrates the delay with three types of simultaneous transitions on the two-line directional interconnect structure of FIG. 2A according to an example arrangement.

FIG. 2A illustrates a two-line directional interconnect structure according to an example arrangement. FIG. 2B illustrates the delay with three types of simultaneous transitions on the two-line directional interconnect structure of FIG. 2A according to an example arrangement. Other arrangements and delays are also possible.

More specifically, FIG. 2A shows an interconnect architecture 200 having drivers 210 and 220, interconnects 240 and 250 and receivers 270 and 280. A signal I1 may be received by the driver 210 and transmitted along the interconnect 240 to the receiver 270, which outputs signal O1. Likewise, an input signal I2 may be received by the driver 220 and transmitted along the interconnect 250 to the receiver 280, which outputs signal O2. In this figure, $C_g$ represents the capacitance between one of the signal lines and a substrate, and $C_c$ represents the capacitance between adjacent signal lines. The inter-wire coupling capacitance $C_c$ is the more dominant capacitance in current and future deep submicron (DSM, hereafter) technologies, which severely increases interconnect delays, interference and power consumption.

The propagation delay across an interconnect is due to the finite time it takes to charge or discharge its capacitive components. Thus, the presence of a coupling capacitor $C_c$ between any two coupled lines $L_1$ and $L_2$, will increase their propagation delays due to the time required to charge/discharge the coupling capacitor $C_c$ by $\Delta Q_c = C_c \times (\Delta V_1 - \Delta V_2)$, where $\Delta V_1$ and $\Delta V_2$ are the voltage level variations on lines $L_1$ and $L_2$, simultaneously. The presence of a coupling capacitor also increases the energy dissipation due to the losses associated with its charging and discharging. The average energy dissipation in each switching incident due to capacitive coupling is $E_C = 0.5 \times C_c \times (\Delta V_1 - \Delta V_2)^2$.

FIG. 2B shows the switching activity of two coupled interconnects at three separate times (a), (b) and (c). The voltage levels on each interconnect switch between 0, representing a LOW logic level, and $V_{DD}$, representing a HIGH logic level. At time (a), switching occurs on both interconnects 240 and 250 in the same direction. At time (b), the signal traversing the interconnect 250 switches alone while the other interconnect 240 remains quiet. At time (c), the signal on the interconnect 250 switches in a direction opposite to that of the signal on its immediately adjacent interconnect 240.

When only one interconnect 250 switches (i.e. time (b)), then the voltage level variations of the interconnects are $\Delta V_1 = 0$ and $\Delta V_2 = -V_{DD}$. Thus, the coupling capacitor is charged by $|\Delta Q| = C_c \times |\Delta V_1 - \Delta V_2| = C_c V_{DD}$ leading to a certain propagation delay ($T_b$) for the switching line. The energy dissipation due to capacitive coupling in this switching scenario is $E_{Cb} = 0.5 \times C_c \times (\Delta V_1 - \Delta V_2)^2 = 0.5 \times C_c \times V_{DD}^2$.

The best-case scenario for delay and energy dissipation occurs when the interconnects simultaneously switch in the same direction (i.e., time (a)), and thus both have the same voltage level variations $\Delta V_1 = \Delta V_2 = V_{DD}$. The coupling capacitor in this case, does not increase the delay or energy dissipation of the switching lines, as the coupling capacitor is neither charged nor discharged ($\Delta V_1 - \Delta V_2$)=0, and hence the total delay of the signal lines is smaller than the case when only one interconnect switches ($T_a < T_b$).

The worst-case scenario for total delay and energy dissipation occurs when immediately adjacent lines simultaneously switch in opposite directions (time (c)), e.g. $\Delta V_1 = -V_{DD}$ and $\Delta V_2 = V_{DD}$. This leads to twice the delay increase due to capacitive coupling compared to case b, as $|\Delta Q| = C_c \times |\Delta V_1 - \Delta V_2| = 2 C_c V_{DD}$, and hence $T_c > T_b$. This worst case bus delay determines the bus cycle time and bus performance. Moreover, the energy dissipation due to capacitive coupling quadruples compared to case b, as $E_{Cc} = 0.5 \times C_c \times (\Delta V_1 - \Delta V_2)^2 = 2 C_c V_{DD}^2 = 4 E_{Cb}$.

The effect of the coupling capacitance changes according to the relative switching activities of the lines that it couples. The relative voltage difference $|\Delta V_1 - \Delta V_2|$ across the coupling capacitance $C_c$ is 0, $V_{DD}$ and $2V_{DD}$, in cases (a), (b), and (c), respectively. This indicates that the coupling capacitance had no effect in case (a) and twice the effect in case (c) compared to case (b). Thus, we can define an equivalent coupling capacitance $C_{c,eq} = MCF \times C_c$, where MCF is the Miller coupling factor. MCF=0 when adjacent lines simultaneously switch similarly, MCF=1 when only one of the adjacent lines switch, and MCF=2 when adjacent lines simultaneously switch in opposite directions.

Reducing the Average Energy Dissipation of the High-Performance Relative Delay Interconnect Architecture One technique to reduce the worst-case delay is to introduce a relative delay between adjacent signal lines. This separates the simultaneous opposite switching edges (MCF=2) and transfers the switching to two consecutive cases of MCF=1. This reduces the worst-case MCF from 2 to 1, hence reducing the worst-case total capacitance and thereby reducing the total bus delay.

However, in arrangements introducing a relative delay to minimize the maximum MCF, the average energy dissipation remains the same. The reason is that introducing a long enough relative delay between oppositely switching signal lines separates the simultaneous opposite switching edges (MCF=2) and transfers the switching to two consecutive cases of MCF=1 and thus reduces the energy dissipation of both signal lines due to coupling from $2C_c V_{DD}^2$ to $2 \times 0.5 C_c V_{DD}^2 = C_c V_{DD}^2$. But on the other hand, introducing the same relative delay between similarly switching signal lines may increase the MCF from 0 to 1 and thus increase the energy dissipation of both signal lines due to coupling from 0 to $2 \times 0.5 C_c V_{DD}^2 = C_c V_{DD}^2$. Introducing a relative delay when MCF=1 does not change the MCF or the energy dissipation of the switching line. Thus, if a relative delay is permanently introduced between any two adjacent signal lines, then the average energy dissipation may not change. It should also be noted that the energy dissipation penalty caused due to introducing the relative delay may occur based on the circuitry (i.e., additional buffers or skewed repeaters) performing the delay.

Embodiments of the present invention introduce a relative delay between adjacent interconnects that not only reduces the maximum MCF and the worst-case delay, but also reduces the average bus energy dissipation. More specifically, embodiments of the present invention introduce a relative delay by lowering a supply voltage (hereafter $V_{DD}$) on alternate signal lines to ($V_{DD} - \Delta V$). Lowering of the supply voltage on alternate signal lines increases the propagation delay of drivers and repeaters on those lines, which lead to a relative delay between switching edges of neighboring signal lines and thus reducing the MCF of the bus/interconnect architecture. The average energy dissipation is proportional to the supply voltage. As discussed above, introducing a relative delay does not change the average energy dissipation; however, embodiments of the present invention not only introduce a relative delay but also lower the supply voltage of alternate lines, and thus the average energy dissipation is reduced by $[1 - (V_{DD} - \Delta V)^2 / V_{DD}^2]$. Thus, the overall average energy dissipation of the bus is reduced by $0.5 \times [1 - (V_{DD} - \Delta V)^2 / V_{DD}^2]$.

Figure 3:
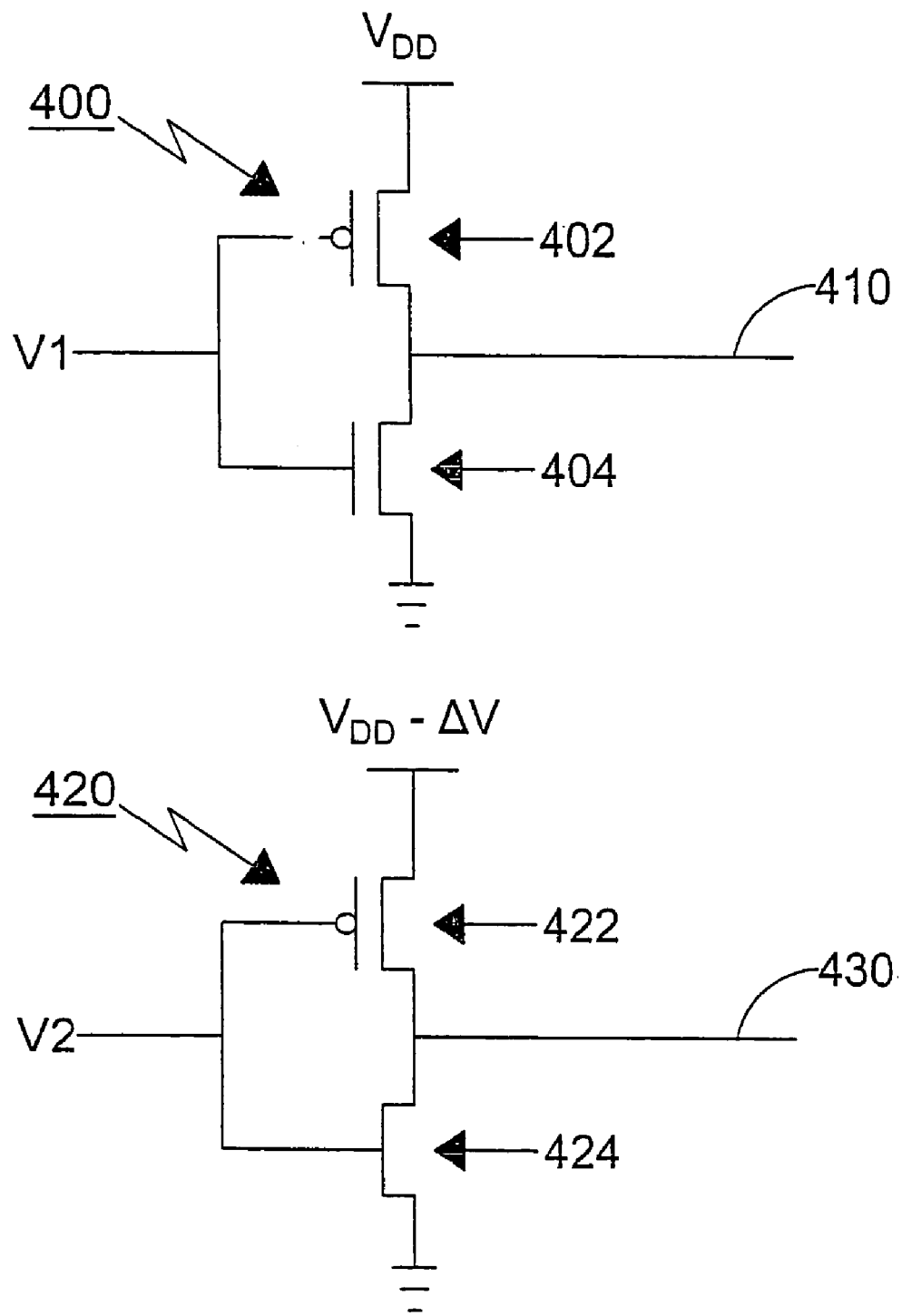
FIG. 3 shows drivers for two adjacent signal lines according to an example embodiment of the present invention.

FIG. 3 shows drivers for two adjacent signal lines of an interconnect architecture according to an example embodiment of the present invention. Other embodiments and configurations are also within scope of the present invention. More specifically, FIG. 3 shows a first driver 400 and a second driver 420. As one example, the drivers 400 and 420 may correspond to the drivers 210 and 220, respectively, shown in FIG. 2A. Other drivers would be provided for additional signal lines. The first driver 400 has a first transistor 402 and a second transistor 404 coupled between supply voltage $V_{DD}$ and GROUND to provide a signal on a signal line 410 (or interconnect). The second driver 420 has a first transistor 422 and a second transistor 424 coupled between the supply voltage $V_{DD} - \Delta V$ and GROUND to provide a signal on a signal line 430 (or interconnect). In this example, the signal lines 410 and 430 (such as corresponding to the interconnects 240 and 250, respectively in FIG. 2A) may extend in a parallel structure such that the signal line 430 is considered adjacent to the signal line 410. Other signal lines are not shown for ease of illustration.

The supply voltage of the second driver 420 is less than the supply voltage of the drivers 400 associated with the adjacent signal line 410. The lowering of the supply voltage on alternative lines (such as the supply voltage of the driver 420) introduces a relative delay between adjacent signal lines, and thus reduces the average energy dissipation of the overall interconnect structure.

Combining Low Power Encoding and Dynamic Relative Delaying in Multi-Stage Time-Borrowing Buses Both worst-case delay and average energy dissipation due to relative-switching of adjacent interconnects may be reduced in a different relative delay scheme. In this scheme, a dynamic delay may be introduced to various signal lines such that oppositely switching signal lines are relatively delayed while similarly switching signal lines are not relatively delayed. Thus, this scheme reduces the worst-case delay (MCF=2) to the delay of an MCF=1 scenario. In addition to that, this scheme reduces the average energy dissipation due to capacitive coupling in the case of MCF=2 from $2C_c V_{DD}^2$ to $C_c V_{DD}^2$ without increasing the energy dissipation due to capacitive coupling in the case of MCF=0. Thus, the overall average energy dissipation of the bus is significantly reduced by dynamically introducing relative delays between adjacent interconnects. A delay decision circuit may be provided that monitors an input data switching pattern and dynamically decides which interconnects should be delayed.

Low-power encoding techniques such as Bus-Invert coding may reduce the switching activity of individual lines. This reduces the energy dissipation associated with the self-switching of the bus lines. In order to reduce both the energy dissipation due to self-switching and that due to relative switching, low power coding techniques can be used followed by dynamic delaying. Applying a low-power bus coding technique such as bus invert coding (by use of a bus invert encoder circuit) followed by dynamic delaying of signal lines (by a dynamic delay circuit) will lead to a significant energy dissipation reduction, but may add a delay due to the introduced delay as well as the delay associated with the bus invert coding hardware and the delay decision circuit. However, when this architecture is applied to long multi-stage interconnect architectures with time-borrowing flip-flop (TBFF) circuits, then the delay overhead will be absorbed and amortized over all the stages of the interconnect architecture. Accordingly, this will achieve power reduction and significantly reduce the delay overhead per stage of the interconnect architecture.

Figure 4:
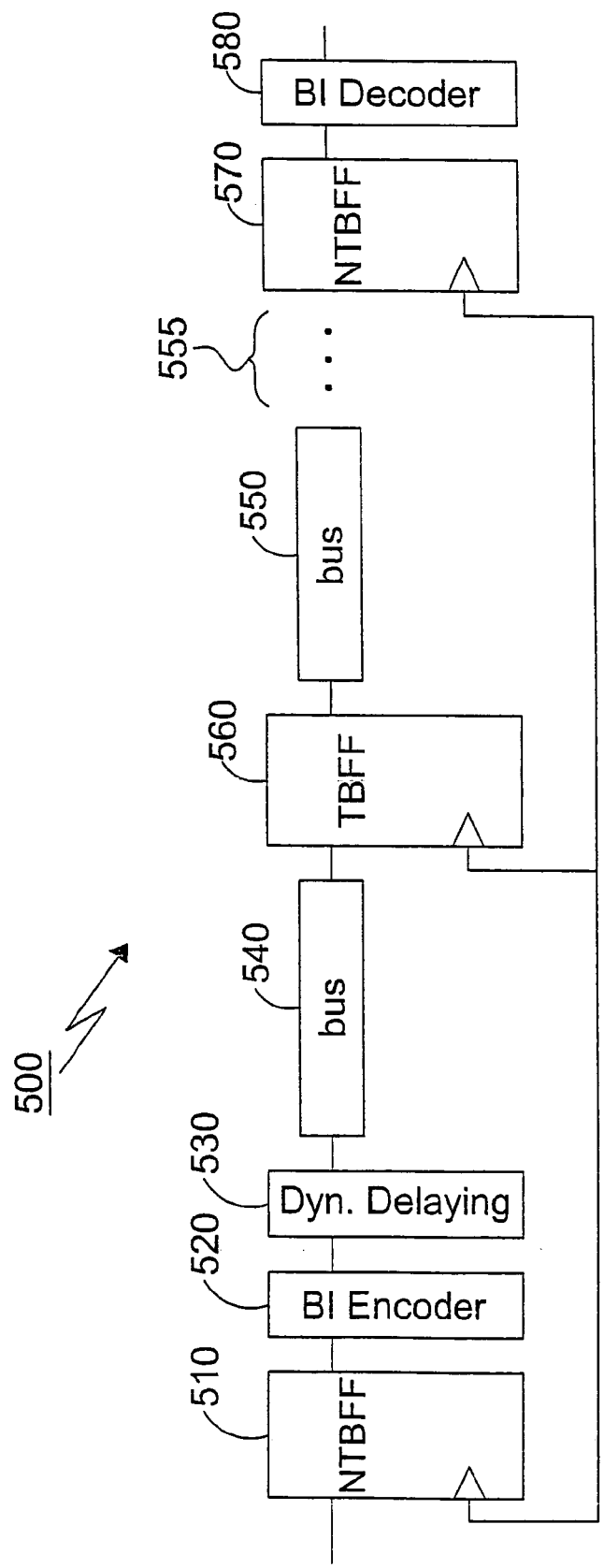
FIG. 4 is a multi-stage interconnect architecture according to an example embodiment of the present invention.

FIG. 4 is a multi-stage interconnect architecture 500 according to an example embodiment of the present invention. Other embodiments and configurations are also within the scope of the present invention. More specifically, FIG. 4 shows a non-time borrowing flip-flop (NTBFF) circuit (or circuits) 510 coupled to a low power bus encoder such as the bus invert encoder circuit 520. The bus invert encoder circuit 520 receives input data from the NTBFF circuit 510 and applies processing so as to minimize the amount of output switching across signal lines. The bus invert encoder circuit 520 is coupled to a dynamic delay circuit 530 that introduces a dynamic delay on certain signal lines based on an input data pattern. The dynamic delay circuit 530 outputs signals onto the signal lines. For ease of illustration, only one signal line is shown in the figure for the first stage output from the dynamic delay circuit 530, although other signal lines would also be similarly coupled to the dynamic delay circuit 530 to form the first stage of the multi-stage interconnect architecture 500.

The multi-stage interconnect architecture 500 includes a first interconnect 540 and a second interconnect 550. Only two stages of the multi-stage interconnect are shown in FIG. 4 although numerous other stages may be provided in the area 555 for the multi-stage interconnect architecture 500. The multi-stage interconnect architecture 500 includes a time-borrowing flip-flop (TBFF) circuit (or circuits) 560 between the various stages, such as between the first and second stages. The TBFF circuit 560 will allow portions of the delay to be passed to its subsequent bus stages. At the end of the multiple stages, such as after the area 555, the multi-stage interconnect architecture 500 also includes a non-time borrowing flip-flop (NTBFF) circuit (or circuits) 570 and a low power bus decoder such as the bus invert decoder circuit 580. The bus invert decoder circuit 580 applies processing to decode the pattern of the bus invert encoder circuit 520 such that the proper output data pattern is provided.

When the above-described architecture is provided to long multi-stage interconnects (or buses) with time-borrowing flip-flops circuits, then the delay overhead is absorbed and amortized (or averaged over all the stages of the interconnect). Thus, the above-described architecture provides more power dissipation reduction compared to only using dynamic relative delays, in addition to significantly reducing the delay overhead per stage.

Embodiments of the present invention provide low power bus coding followed by dynamic delaying the data of certain signal lines of a multi-stage interconnect structure. This leads to significant energy savings by reducing the energy dissipation due to switching while adding a small delay overhead per bus stage.

Embodiments of the present invention may be provided within one or more chips or chipsets within an electrical assembly. The term electrical assembly may be part of an electronic system. An electronic system may be any product including an electronic assembly. Examples of electronic systems include computers (e.g. desktop, laptop, hand-held, server, etc.), wireless communications devices (e.g. cellular phone, cordless phones, pagers, etc.), computer-related peripherals (e.g., printers, scanners, monitors, etc.), entertainment devices (e.g. televisions, radios, stereos, tap and compact disc players, video cassette recorders, MP3 (Motion Picture Experts Group, Audio Layer 3) players, etc.), and the like.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. An interconnect architecture comprising:
a first interconnect;
a second interconnect adjacent to the first interconnect; and
a driving device to drive a signal on the first interconnect and to drive a signal on the second interconnect such that a relative delay occurs between signals on the first interconnect and the second interconnect and to reduce an average energy dissipation.

2. The interconnect architecture of claim 1, wherein the driving device comprising a first driver coupled to a first voltage and a second driver coupled to a second voltage different than the first voltage.

3. The interconnect architecture of claim 2, wherein the second voltage is less than the first voltage.

4. The interconnect architecture of claim 2, wherein the second voltage causes the relative delay between the signals on the first interconnect and the second interconnect.

5. The interconnect architecture of claim 2, wherein the second voltage reduces a worst-case Miller Coupling Factor (MCF) between the first interconnect and the second interconnect.

6. The interconnect architecture of claim 2, wherein the second voltage reduces the average energy dissipation of the interconnect architecture.

7. The interconnect architecture of claim 1, wherein the driving device reduces a worst-case delay of each interconnect.

8. The interconnect architecture of claim 1, wherein a first driver of the driving device includes an inverter circuit having a first transistor coupled to a first voltage and a second transistor coupled to a predetermined voltage, and a second driver of the driving device includes an inverter circuit having a third transistor coupled to a second voltage and a fourth transistor coupled to the predetermined voltage, the second voltage being different than the first voltage.

9. A interconnect architecture comprising:
a first interconnect;
a second interconnect; and
a delay circuit to delay signals on the first interconnect as compared to signals on the second interconnect based on switching activities of patterns of signals to be applied to the first interconnect and the second interconnect.

10. The interconnect architecture of claim 9, wherein the delay circuit reduces an average energy dissipation along the interconnect architecture.

11. The interconnect architecture of claim 10, wherein the delay circuit reduces a worst-case delay along the interconnect architecture.

12. The interconnect architecture of claim 9, further comprising an encoder circuit to receive a data pattern for the first interconnect and the second interconnect and to reduce an amount of switching across the first interconnect and the second interconnect.

13. The interconnect architecture of claim 12, wherein the encoder circuit outputs signals to the delay circuit.

14. The interconnect architecture of claim 9, wherein the first interconnect and the second interconnect form a first interconnect stage, and the architecture further includes a second interconnect stage.

15. The interconnect architecture of claim 14, further comprising a decoder circuit to decode signals having traversed the first interconnect stage and the second interconnect stage.

16. The interconnect architecture of claim 14, further comprising a time-borrowing flip-flop circuit provided between the first interconnect stage and the second interconnect stage.

17. An architecture comprising:
a first stage of signal lines;
a second stage of signal lines;
a circuit to receive data and to minimize an amount of switching across the signal lines; and
a dynamic delay device coupled to receive outputs of the circuit, the dynamic delay device to introduce a dynamic delay on certain ones of the signal lines based on an input data pattern.

18. The architecture of claim 17, wherein the dynamic delay device outputs signals onto the signal lines of the first stage.

19. The architecture of claim 17, further comprising a time-borrowing flip-flop circuit provided between the first stage and the second stage.

20. The architecture of claim 17, further comprising a decoder circuit to decode signals having traversed the first stage and the second stage.

21. The architecture of claim 17, wherein the circuit reduces a number of switching activities for signal lines.

* * * * *

UNITED STATES PATENT AND TRADEMARK OFFICE
CERTIFICATE OF CORRECTION

PATENT NO.         : 7,190,286 B2                                    Page 1 of 1
APPLICATION NO. : 11/314236
DATED              : March 13, 2007
INVENTOR(S)        : Maged M. Ghoneima et al.

It is certified that error appears in the above-identified patent and that said Letters Patent is hereby corrected as shown below:

Title page, item (75) inventors should read as follows:

Maged M. Ghoneima, Evanston, IL (US);
Peter Caputa, Linkoping (SE);
Muhammad M. Khellah, Lake Oswego, OR (US);
Ram Krishnamurthy, Portland, OR (US);
James W. Tschanz, Portland, OR (US);
Yibin Ye, Hillsboro, OR (US);
Vivek K. De, Beaverton, OR (US);
Yehea I Ismail, Evanston, IL (US Signed and Sealed this Twelfth Day of February, 2008

JON W. DUDAS
*Director of the United States Patent and Trademark Office*